March 2, 1954 J. S. STEINFELD 2,671,034

METHOD FOR PRODUCING MAGNETIC RECORDING TAPE

Filed Dec. 16, 1950

INVENTOR.
JULIAN S. STEINFELD
BY [signature]
his ATTORNEY

Patented Mar. 2, 1954

2,671,034

UNITED STATES PATENT OFFICE 2,671,034

METHOD FOR PRODUCING MAGNETIC RECORDING TAPE

Julian S. Steinfeld, Brooklyn, N. Y.

Application December 16, 1950, Serial No. 201,135

6 Claims. (Cl. 117—71)

This invention relates to magnetic sound recording and, more particularly, to an improved recording tape comprising a substantially diamagnetic strip having at least one surface substantially completely covered with paramagnetic material.

The recording elements or media for magnetic recorders are usually either a magnetizable wire or a magnetizable tape. Where storage capacity for the lineal recording medium or total length of recording time is not of primary importance, the magnetizable tape is preferred due to the higher fidelity of recording and reproduction obtainable therewith as compared to a wire record.

It will be appreciated, however, that the same length of recording on a magnetic tape requires several times the amount of magnetic material as does a magnetic wire. Consequently, a magnetic tape record is several times as expensive as a magnetic wire record.

For this reason, various proposals have been made for reducing the cost of a recording tape relative to that of a recording wire. Among other proposed solutions has been that of dividing the tape transversely into several longitudinal recording channels, thereby increasing the effective recording length. This has been effected by the use of a plurality of recording heads each cooperable with only a minor portion of the total tape width. However, this solution is expensive and complicated insofar as the recording and reproducing apparatus is concerned.

A more widely used expedient is that of providing a tape of inexpensive diamagnetic material, such as paper, plastic, etc., and coating a surface of this tape with particles of a paramagnetic material. Such coating has been effected by applying a binder to the tape surface and impregnating this binder with magnetic particles such as iron filings, for example. With this procedure, the coated tape surface comprises about 35% magnetic material by volume and about 65% binder by volume, or roughly a one-third coating of the surface with magnetic materials.

Additionally, the coated tape is relatively thick. For example, the uncoated tape may have a thickness of 0.0015″ and the binder and magnetic particle coating will be about 0.0007″ thick. The binder and magnetic coating thus increase the base thickness by nearly 50%. For practical operating reasons and for best recording and reproducing results, it is desirable to keep the tape as thin as possible.

In accordance with the present invention, a much more effective paramagnetic coating of a diamagnetic base tape is provided with a resultant substantial decrease in the overall thickness of the coated tape. To this end, a tape of diamagnetic material is moved longitudinally of itself through a highly evacuated chamber and across a suitably apertured support. During its passage across the aperture, the tape has its undersurface coated with evaporated paramagnetic metal particles which are forcibly impinged thereon by virtue of the pressure differential due to such vacuum.

The metal is provided in the form of a strip or filament which is heated to the metal evaporation temperature during passage of the strip toward the aperture. Such heating may be advantageously effected by induction heating means, although resistance or conductance heating, or ultrasonic vibration may be utilized to change the solid metal to a spray of fine particles.

As the tape passes perpendicularly to the spray direction, the evaporating metal particles tend to deposit more heavily at the center of the tape. Consequently, the aperture is so shaped that the side edges of the moving tape are exposed to the stream of evaporated metal particles for a longer time than is the center portion of the tape. This greatly enhances the uniformity of the coating transversely of the tape.

The coated surface of the tape is then pressure impregnated with a lacquer, liquid resin, or other protective binder which provides abrasion resistance for the finely porous metal particles deposited in vacuo. With the described process, the resultant coating is in excess of 70% metal and less than 30% binder, and the coating is only about ⅓ the thickness of the base tape.

For an understanding of the invention principles, reference is made to the following detailed description of a typical embodiment thereof as illustrated in the accompanying drawing. In the drawing.

Figure 1:
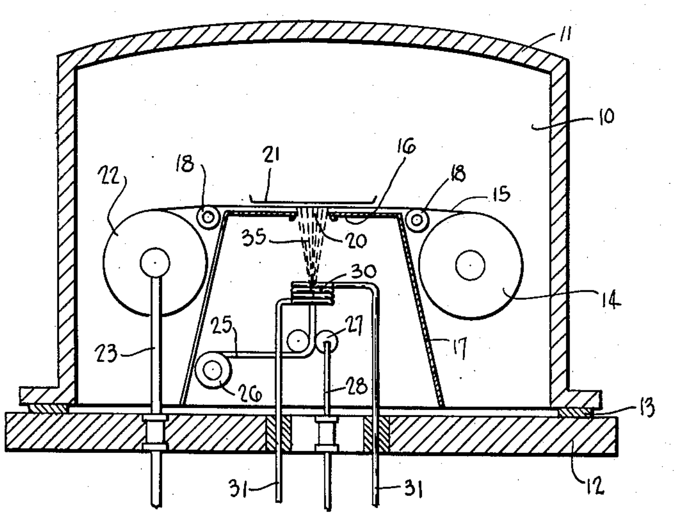
Fig. 1 is a somewhat schematic vertical sectional view through apparatus for performing the invention method.

Referring to Fig. 1, the apparatus comprises a casing 11 which rests on a base 12 with the interposition of a gasket 13. The combination provides a vacuum chamber 10 which is highly evacuated, for example, to a pressure of from $10^{-4}$ to $10^{-7}$ mm. of mercury.

Within chamber 10 is a spool 14 containing a supply of diamagnetic tape 15. Tape 15 is of any suitable non-magnetic material having the required tensile strength, and abrasion resistance, and surface smoothness. A preferred material is cellulose acetate, but other material such as paper, glass, and other synthetic resins may be used.

Tape 15 withdrawn from spool 14 passes longitudinally of itself relative to the aperture of upper wall 16 of a shield 17, being guided over wall 16 by idler rollers 18. In passing aperture 20 of wall 16, the tape passes beneath a guide support 21 substantially parallel to wall 16. Tape 15, after coating with paramagnetic metal, is wound onto a spool 22 driven from a suitable power source by a vacuum-sealed drive generally indicated at 23.

Within shield 17 is mounted a spool 26 carrying a length of paramagnetic metal 25. Metal 25 is selected from the ferromagnetic group comprising iron, nickel and cobalt, these materials being used either singly or in combination. Oxides thereof may also be used depending on the specific magnetic properties desired. The desired magnetic properties may also be provided by other paramagnetic materials such as manganese, copper, and aluminum used in alloy form with the above ferro-magnetic metals.

Metal 25 is withdrawn at a uniform rate from spool 26 by friction rollers 27 driven by a suitable vacuum-sealed drive indicated at 28. Rollers 27 direct metal 25 through an induction heating coil 30 energized by conductors 31 extending in insulated, sealed relation through base 12 to a source of electric power. Induction heating is illustrated by way of example only, as other electric heating, such as resistance or conduction, or ultrasonic vibrations may be used to change the metal 25 into fine particles.

In induction coil 30, metal 25 is heated to its evaporation temperature which may range from 1500 C. to 3500 C. depending upon the particular metal or alloy involved. The evaporated metal particles pass, as a fine spray 35, through orifice 20 and condense, as a relatively dense coating on the under surface of the relatively cool tape 15.

The center line of tape 15 passes perpendicularly to the evaporation point and this perpendicular is the shortest distance between the evaporation point and the tape. The evaporated particles thus tend to deposit more heavily at the center line of the moving tape, and the coating decreases in thickness toward the edges of the tape.

Since the base material or tape 15 is moving at a uniform rate relative to the evaporation point, a more uniform coating can be obtained by providing a longer time interval for metal deposition at the tape edges than at the tape center line. This can be effected by the novel configuration of aperture 20 as best seen in Fig. 2.

Figure 2:
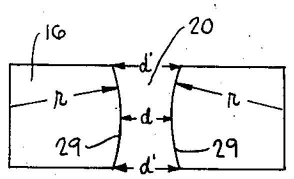
Fig. 2 is a plan view of the aperture through which the evaporated metal particles pass to the tape surface.
Figure 3:
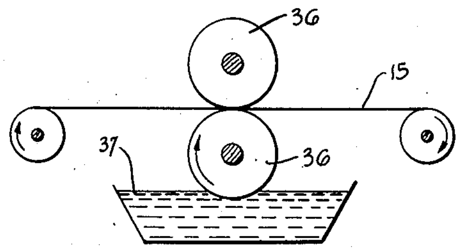
Fig. 3 is a schematic view illustrating the application of the protective binder.

Referring to Fig. 2, the leading and trailing edges 29, 29 of aperture 20 are curved convexly about radii $r$, whereby the length $d'$ of aperture 20 at the side edges of the tape is greater than the length $d$ at the center line. Radii $r$ are so selected that $d'$ is sufficiently greater than $d$ that the increasing deposition time toward the tape edges is sufficient to insure a substantially uniform metal thickness transversely of the tape.

The condensed magnetic particles on tape 15 are finely porous. Hence, it is desirable to protect them against adsorption and abrasion. For this purpose, the coated tape 15, after removal from vacuum chamber 10 is drawn through a pair of pressure rollers 36, 36′, one of which, 36, is hardened steel and the other of which, 36′, is hard rubber. The steel roller 36 passes through a lacquer bath 37 so that the peripheral surface thereof transports a thin film of lacquer into pressure contact with that surface of tape 15 carrying the magnetic particles heretofore deposited. By this, or similar means, the coated surface is impregnated with a lacquer, liquid resin, or other cohesive binder which provides protection and abrasion resistance for the coated surface.

With the invention arrangement, the coating of tape 15 comprises in excess of 70% magnetic material and less than 30% binder. This compares with prior art magnetic coatings of 35% magnetic material and 65% binder. The thermally evaporated magnetic material provides a uniform dense coating and a highly uniform metallic particle size on tape 15. Additionally, the thickness of the coating is of the order of 0.0005″ on a 0.0015″ thick tape, being about one-quarter of the total thickness, whereas prior coatings have been 0.0007″ thick or about one-third of the total thickness.

While a specific embodiment of the invention has been shown and described in detail to illustrate the application of the invention principles thereof, it should be understood that the invention may be otherwise embodied without departing from such principles.

What is claimed is:

1. The method of forming a magnetic recording medium comprising passing diamagnetic tape located in a vacuum along a shield having an aperture, evaporating paramagnetic metal in spaced relation to the surface of the diamagnetic tape passing the aperture of such shield, for impinging the evaporated metal forcibly against such surface by virtue of the reduced gas pressure at the shield aperture and the diamagnetic tape relative to the pressure at the evaporation source, and condensing the evaporated metal on the diamagnetic tape in such vacuum.

2. The method of forming a magnetic recording medium comprising passing diamagnetic tape located in a vacuum along a shield having an aperture, thermally evaporating paramagnetic metal in spaced relation to the surface of the diamagnetic passing the aperture of such shield for impinging the evaporated metal forcibly against such surface by virtue of the reduced gas pressure at the shield aperture and the diamagnetic tape relative to the pressure at the evaporation source, and condensing the evaporated metal on the diamagnetic tape in such vacuum.

3. The method of forming a magnetic recording medium comprising passing diamagnetic tape located in a vacuum along a shield having an aperture, evaporating paramagnetic metal in spaced relation to the surface of the diamagnetic tape passing the aperture of such shield for impinging the evaporated metal forcibly against such surface by virtue of the reduced gas pressure at the shield aperture and the diamagnetic tape relative to the pressure at the evaporation source, while the tape is moving in such vacuum relative to the evaporation source and the aperture in the shield.

4. The method of forming a magnetic recording medium comprising passing diamagnetic tape located in a vacuum along a shield having an aperture, evaporating paramagnetic metal in spaced relation to the surface of the diamagnetic tape passing the aperture of such shield for impinging the evaporated metal forcibly against such surface by virtue of the reduced gas pressure which provides an extended mean free path for the evaporating paramagnetic metal between the evaporation source and the diamagnetic tape, condensing the evaporated metal on the diamagnetic tape while the latter is moving in such vacuum, and controlling the exposure time of the laterally adjacent moving tape portions to the evaporated metal being in proportion to the lateral distance of such portions from the tape longitudinal center line toward each longitudinal tape edge.

5. The method of forming a magnetic recording medium comprising passing diamagnetic tape located in a vacuum along a shield having an aperture, thermally evaporating paramagnetic metal in spaced relation to the surface of diamagnetic tape passing the aperture of such shield for impinging the evaporated metal forcibly against such surface by virtue of the reduced gas pressure which provides an extended mean free path for the evaporating metal between the evaporation source and the diamagnetic tape, condensing the evaporated metal on the diamagnetic tape while the latter is moving in such vacuum relative to the evaporation point, and thereafter progressively pressure impregnating the metal coating with a hardenable protective film.

6. The method of forming a magnetic recording medium comprising passing diamagnetic tape located in a vacuum along a shield having an aperture, thermally evaporating paramagnetic metal in spaced relation to the surface of the diamagnetic tape passing the aperture of such shield for impinging the evaporated metal forcibly against such surface by virtue of the reduced gas pressure which provides an extended mean free path for the evaporating paramagnetic metal between the evaporation source and the diamagnetic tape, condensing the evaporated metal on the diamagnetic tape while the latter is moving in such vacuum relative to the evaporation point, controlling the exposure time of the laterally adjacent moving tape portions to the evaporated metal being in proportion to the lateral distance of such portions from the tape longitudinal center line toward each longitudinal tape edge, and thereafter progressively pressing the metal coating against a surface carrying a hardenable film material in a solvent to form a hardenable film protecting the metal coating.

JULIAN S. STEINFELD.

References Cited in the file of this patent

UNITED STATES PATENTS

| Number | Name | Date |
|---|---|---|
| 2,143,723 | Walker et al. | Jan. 10, 1937 |
| 2,153,363 | Bruche | Apr. 4, 1939 |
| 2,160,981 | O'Brien | June 6, 1939 |
| 2,317,789 | Marriott | Apr. 27, 1943 |
| 2,322,613 | Alexander | June 22, 1943 |
| 2,332,309 | Drummond | Oct. 19, 1943 |
| 2,382,432 | McManus et al. | Aug. 14, 1945 |
| 2,417,924 | Gary | Mar. 25, 1947 |
| 2,524,433 | Downs et al. | Oct. 3, 1950 |

FOREIGN PATENTS

| Number | Country | Date |
|---|---|---|
| 340,705 | Great Britain | Jan. 8, 1931 |